US008243026B2

(12) United States Patent
Huang

(10) Patent No.: US 8,243,026 B2
(45) Date of Patent: Aug. 14, 2012

(54) SYSTEM AND METHOD FOR SELECTING A CHARACTER IN A MOBILE DEVICE

(75) Inventor: Yi-Min Huang, Tu-Cheng (TW)

(73) Assignee: Chi Mei Communication Systems, Inc., Tu-Cheng, New Taipei (TW)

(*) Notice: Subject to any disclaimer, the term of this patent is extended or adjusted under 35 U.S.C. 154(b) by 544 days.

(21) Appl. No.: 12/549,484

(22) Filed: Aug. 28, 2009

(65) Prior Publication Data

US 2010/0156802 A1 Jun. 24, 2010

(30) Foreign Application Priority Data

Dec. 18, 2008 (CN) .......................... 2008 1 0306340

(51) Int. Cl.
*G06F 3/02* (2006.01)
(52) U.S. Cl. ...................... 345/172; 345/160; 345/170

(58) Field of Classification Search .................... None
See application file for complete search history.

(56) References Cited

U.S. PATENT DOCUMENTS 7,735,014 B2 * 6/2010 Bergstrom et al. ........... 715/758
2005/0119019 A1 * 6/2005 Jang ............................. 455/466

* cited by examiner

*Primary Examiner* — Muhammad N Edun
(74) *Attorney, Agent, or Firm* — Altis Law Group, Inc.

(57) ABSTRACT

A mobile device includes a character selecting system to select proper characters to edit a short message on the mobile electronic device. Selection of the proper characters by the character selecting system includes generation of a character list to edit a short message, generation of a number list corresponding to the character list, and activation of key-presses on the mobile device corresponding to numbers in the number list, to select the proper characters from the character list to edit the short message.

9 Claims, 5 Drawing Sheets

SYSTEM AND METHOD FOR SELECTING A CHARACTER IN A MOBILE DEVICE

BACKGROUND

1. Technical Field

Embodiments of the present disclosure generally relate to techniques of selecting characters, and more particularly to a system and method for selecting a character to edit a short message in a mobile device.

2. Description of Related Art

A mobile device, such as a mobile phone, or a personal digital assistant (PDA) for example, may be configured with a keypad to edit a short message on a short message editing interface.

In this manner, a key-press on the keypad may be repeatedly pressed to select a corresponding character to edit the short message on the short message editing interface. For example, the key-press "6" may be pressed three times to select the character "O." This method can be cumbersome, leading to incorrect selection of a character.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
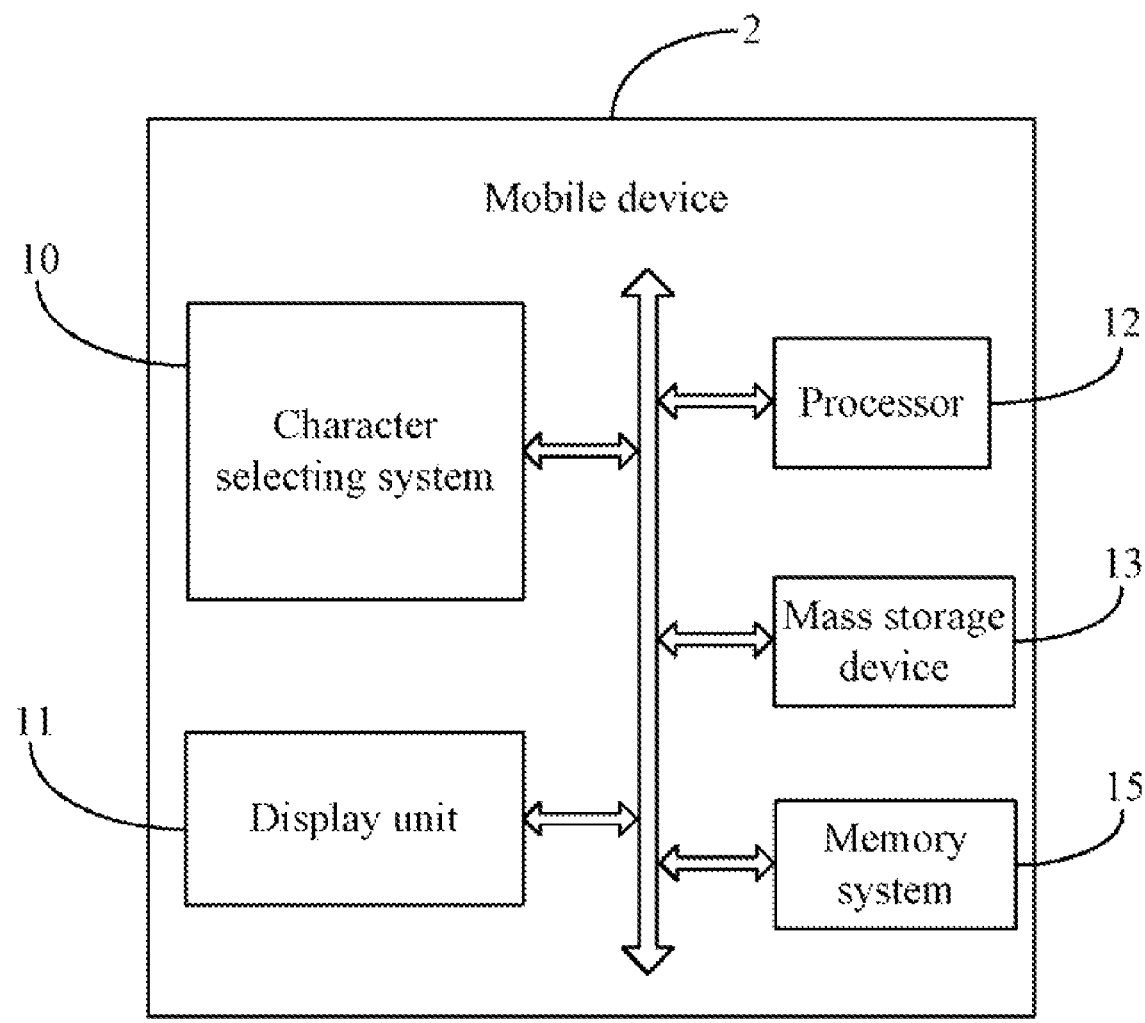
FIG. 1 is a block diagram of one embodiment of a mobile device for selecting a character to edit a short message in the mobile device.

FIG. 1 is a block diagram of one embodiment of a mobile device 2. The mobile device 2 may include a character selecting system 10 and a display unit 11. The character selecting system 10 may be used to select a character to edit a short message in the mobile device 2, utilizing a short message editing interface displayed by the display unit 11 of the mobile device 2. The character may be a letter, a number, or a punctuation mark, for example.

The mobile device 2 may be a mobile phone, or a personal digital assistant (PDA), for example. In the embodiment, the mobile device 2 may include a memory system 15, such as a random access memory (RAM) for temporary storage of information and/or a read only memory (ROM) for permanent storage of information, and/or a mass storage device 13, such as a hard drive, or optical media storage device. The mass storage device 13 may comprise one or more hard disk drives, optical drive, networked drive, or some combination of various digital storage systems. The mobile device 2 also includes at least one processor 12 for computation. Typically, the modules in the mobile device 2 are in data communication via one or more standards-based bus system. In other embodiments, the standards-based bus system could be Peripheral Component Interconnect (PCI), Microchannel, SCSI, Industrial Standard Architecture (ISA) and Extended ISA (EISA) architectures, for example. The memory system 15 or the mass storage device 13 may include one or more function modules to implement the character selecting system 10.

The mobile device 2 is generally controlled and coordinated by operating system software, such as the UNIX, Linux, Windows 95, 98, NT, 2000, XP, Vista, Mac OS X, an embedded operating system, or any other compatible operating systems. In other embodiments, the mobile device 2 may be controlled by a proprietary operating system.

Figure 2:
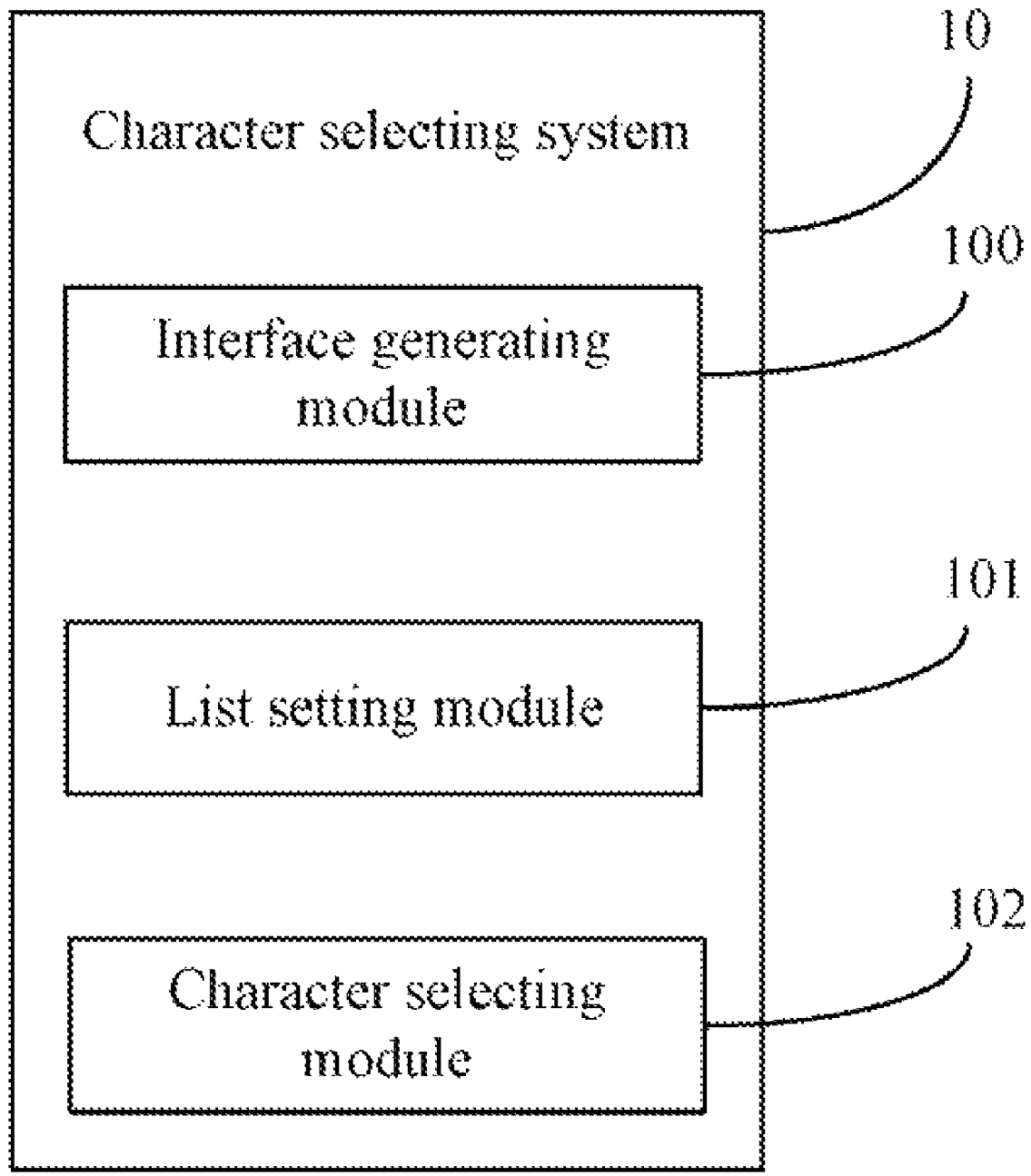
FIG. 2 is a block diagram of one embodiment of function modules included in the mobile device of FIG. 1.

FIG. 2 is a block diagram of the function modules of the character selecting system 10. In one embodiment, the character selecting system 10 may include an interface generating module 100, a list setting module 101, and a character selecting module 102. The function modules 100, 101, and 102 may be used to implement certain methods for the mobile device 2 described herein. Depending on the embodiment, the functionality described below with reference to certain components and modules of the character selecting system 10 may be combined into fewer components and modules or further separated into additional components or modules.

Figure 3:
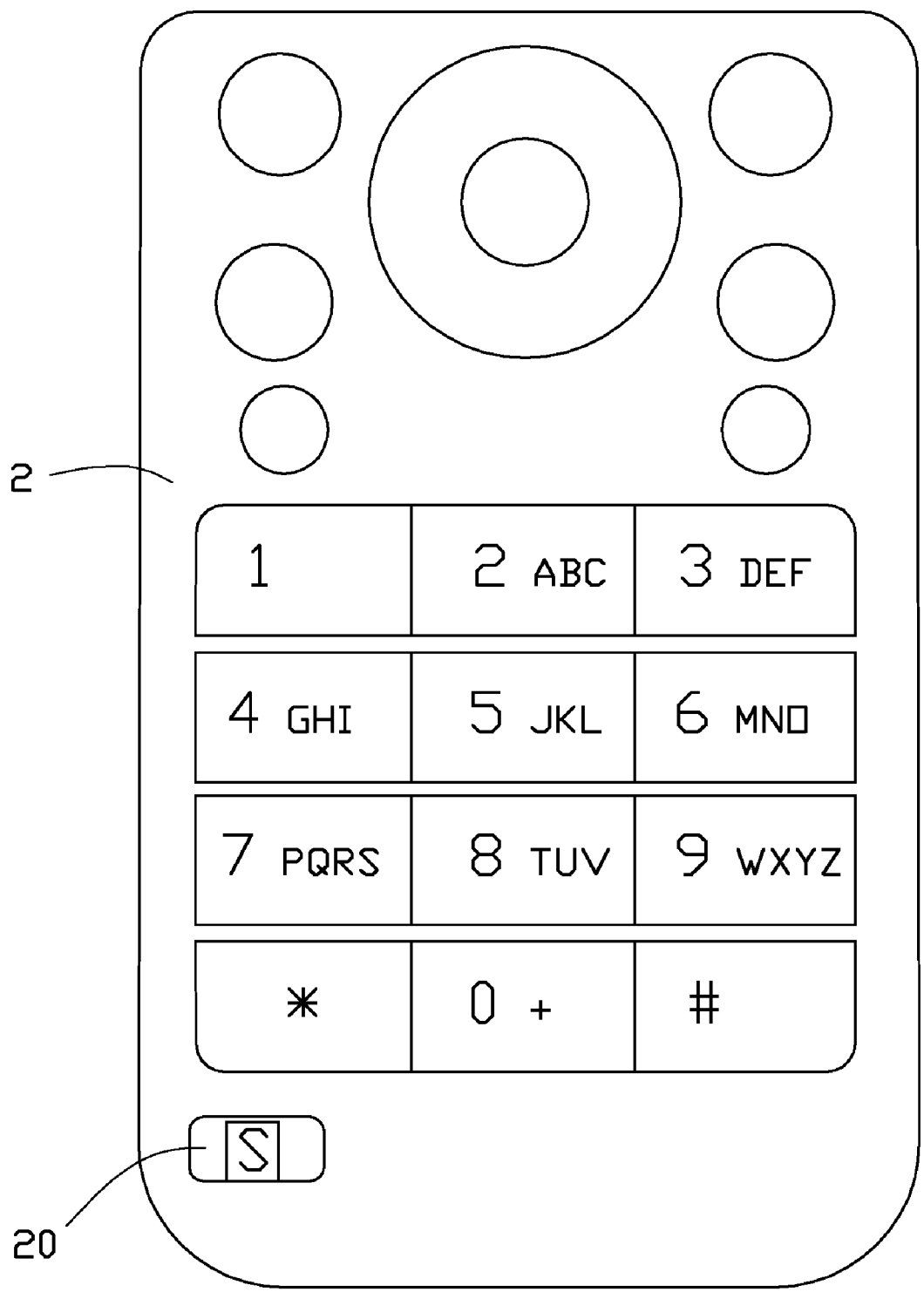
FIG. 3 illustrates one embodiment of a keypad of the mobile device of FIG. 1.
Figure 4:
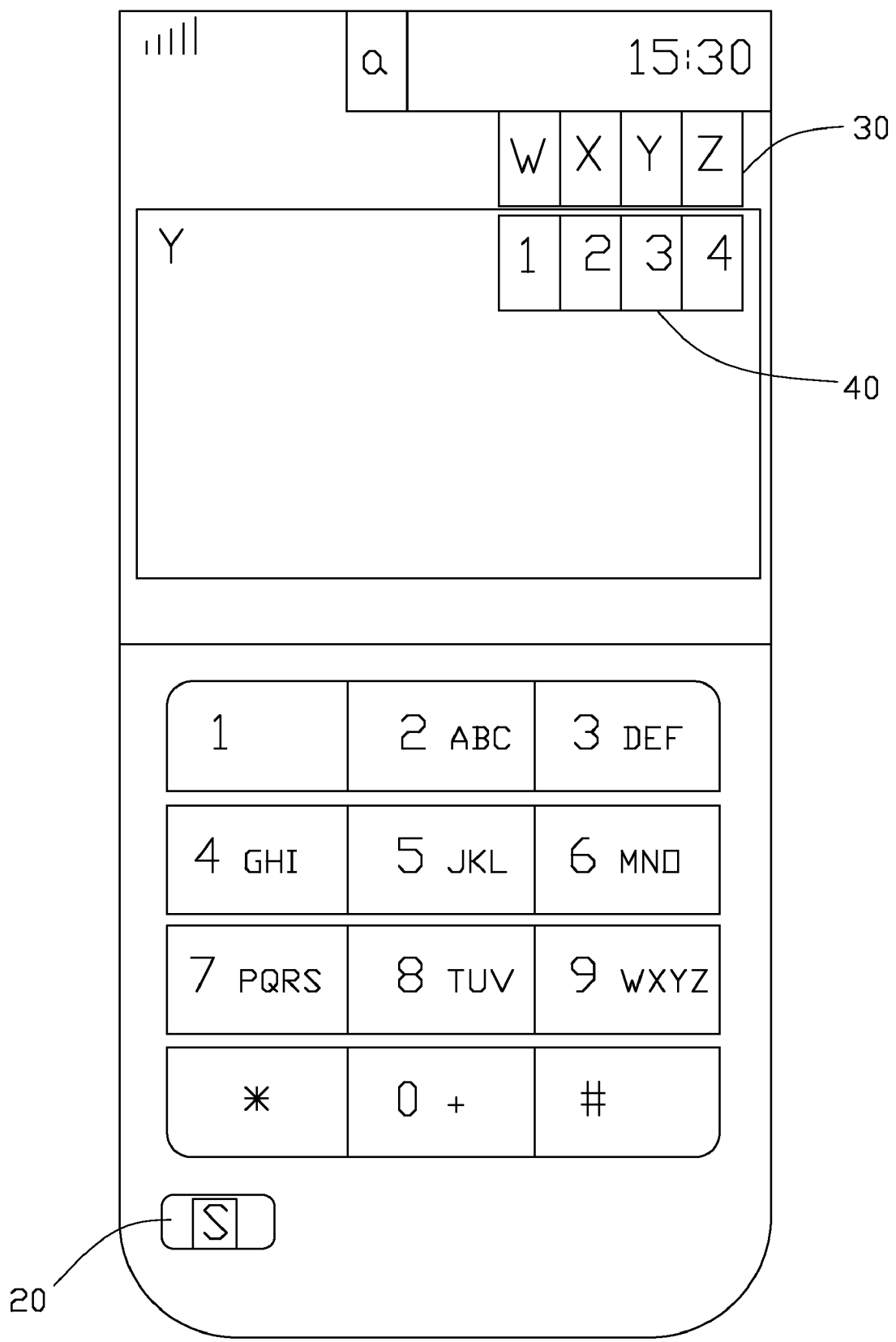
FIG. 4 illustrates one embodiment of a short message editing interface on the mobile device of FIG. 1.

In one embodiment, a key-press 20 (refer to FIG. 3) of the mobile device 2 may be preconfigured as an activation key-press. The activation key-press may be pressed by a user to display a number list 40 corresponding to a character list 30. The character list may be formed on a short message editing interface when a short message needs to be edited, and may include one or more characters to be selected to edit the short message on the short message editing interface. The key-press preconfigured on the mobile device 2, is shown in FIG. 3 described below, for example. One embodiment of the number list 40, the character list 30, and the short message editing interface, are shown in FIG. 4 described below, for example.

As shown in FIG. 3, the key-press "S" 20 may be preconfigured on the mobile device 2 to be an activation key-press of the number list 40 corresponding to the character list 30. Other key-presses, such as "0"-"9," "*," and "#," are normal key-presses of the mobile device 2.

The interface generating module 100 is operable to generate the short message editing interface when the short message needs to be edited, and display the short message editing interface on the display unit 11.

The list setting module 101 is operable to set the preconfigured key-press as an activation key-press of the number list 40 corresponding to the character list 30. The list setting module 101 is further operable to generate the number list 40 when the character list 30 is formed to edit the short message on the short message editing interface. In addition, the list setting module 101 is operable to match each character in the character list 30 with a corresponding number in the number list 40.

As shown in FIG. 4, the character list 30 includes characters "W," "X," "Y," and "Z," and is formed on the short message editing interface to edit the short message when the short message needs to be edited. The number list 40 includes numbers "1," "2," "3," and "4," and is generated by the list setting module 101 corresponding to the character list 30. Each character in the character list 30 is matched with a corresponding number in the number list 40. The number "1" in the number list 40 is matched with the character "W" in the character list 30. The number "2" in the number list 40 is matched with the character "X" in the character list 30. The number "3" in the number list 40 is matched with the character "Y" in the character list 30. The number "4" in the number list 40 is matched with the character "Z" in the character list 30. The character "Y" in the character list 30 is selected by pressing the key-press "3" that corresponds to the number "3" in the number list 40.

The character selecting module 102 is operable to activate a normal key-press on the mobile device corresponding to a number in the number list 40, and select a character matched with the number from the character list 30 to edit the short message. The character selecting module 102 is further operable to determine whether another character needs to be selected to edit the short message on the short message editing interface.

Figure 5:
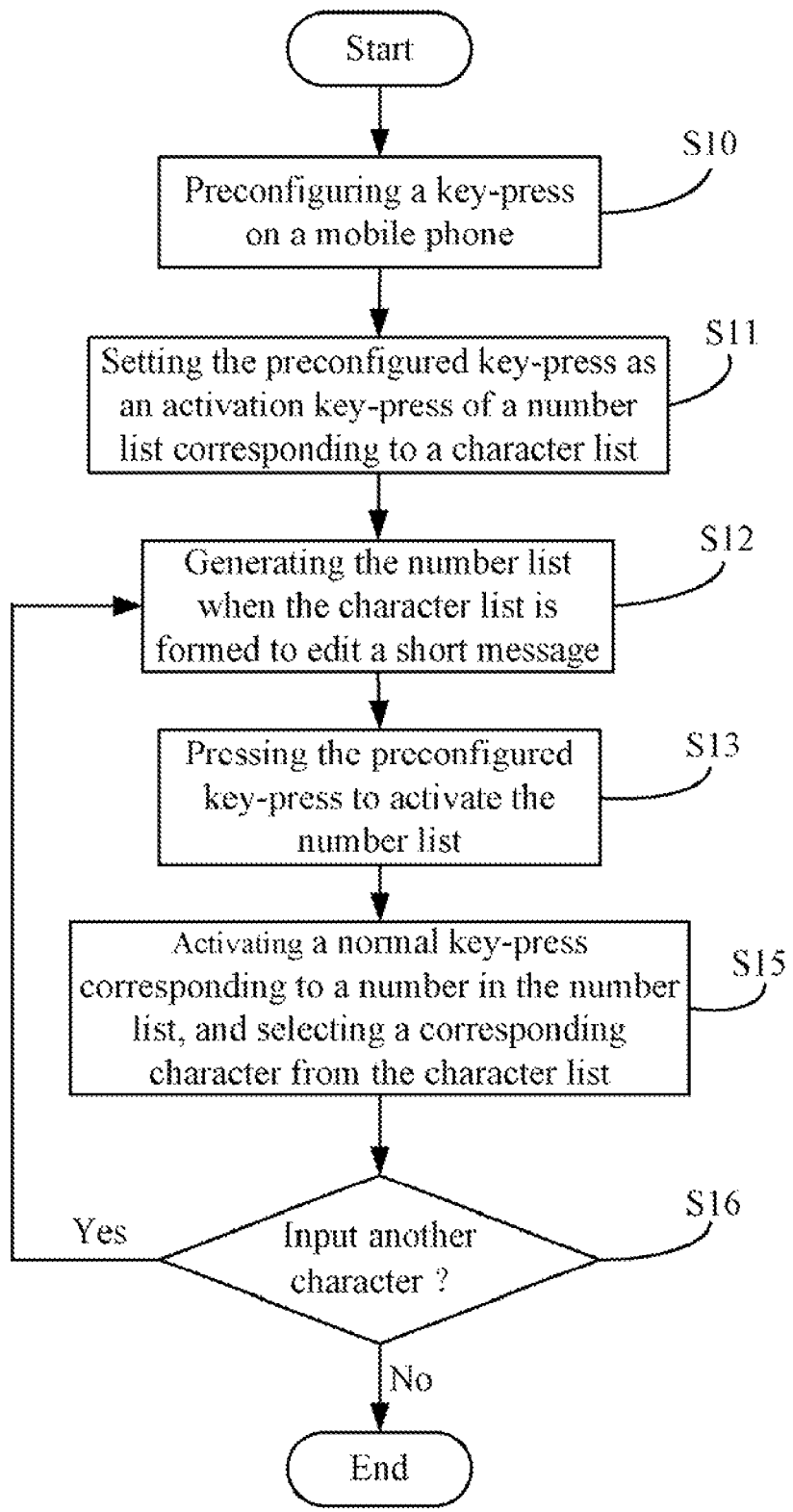
FIG. 5 is a flowchart illustrating one embodiment of a method for selecting a character to edit a short message in a mobile device.

FIG. 5 is a flowchart illustrating one embodiment of a method for selecting a character to edit a short message in the mobile device 2. Depending on the embodiment, additional blocks in the flow of FIG. 5 may be added, others removed, and the ordering of the blocks may be changed.

In block S10, a key-press is preconfigured on the mobile device 2 to be an activation key-press of a number list 40 corresponding to a character list 30. As mentioned above, the character list 30 may be formed on a short message editing interface displayed on the display unit 11 when a short message needs to be edited, and may include one or more characters to be selected to edit the short message on the short message editing interface.

In block S11, the interface generating module 100 generates the short message editing interface when the short message needs to be edited, and displays the short message editing interface on the display unit 11.

In block S11, the list setting module 101 sets the preconfigured key-press as an activation key-press of the number list 40 corresponding to the character list 30.

In block S12, the list setting module 101 generates the number list 40 when the character list 30 is formed to edit the short message on the short message editing interface, and matches each character in the character list 30 with a corresponding number in the number list 40.

In block S13, the preconfigured key-press is pressed to activate the number list 40.

In block S15, the character selecting module 102 activates a normal key-press on the mobile device 2 corresponding to a number in the number list 40, and selects a character matched with the number from the character list 30 to edit the short message on the short message editing interface.

In block S16, the character selecting module 102 determines whether another character needs to be selected to edit the short message on the short message editing interface.

If another character needs to be selected to edit the short message on the short message editing interface, then the procedure goes to block S12 described above. Otherwise, if no character needs to be selected to edit the short message on the short message editing interface, then the procedure ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile device, comprising:
  a display unit, a storage system, and at least one processor; and
  a character selecting system stored in the storage system and being executable by the at least one processor, the character selecting system comprising:
  an interface generating module operable to generate a short message editing interface, and display the short message editing interface on the display unit;
  a list setting module operable to set a preconfigured key-press of the mobile device to be an activation key-press of a number list corresponding to a character list, generate the number list when the character list is formed to edit a short message on the short message editing interface, and match each character in the character list with a number in the number list; and
  a character selecting module operable to activate a normal key-press on the mobile device corresponding to a number in the number list, and select a character matched with the number from the character list to edit the short message.

2. The mobile device as described in claim 1, wherein the character selecting module is further operable to determine whether another character needs to be selected to edit the short message.

3. The mobile device as described in claim 1, wherein the character is selected from the group consisting of a letter, a number, and a punctuation mark.

4. A computer-implemented method for selecting a character to edit a short message in a mobile device, the method comprising:
  (a) controlling a display unit of the mobile device to display a short message editing interface;
  (b) setting a preconfigured key-press of the mobile device to be an activation key-press of a number list corresponding to a character list;
  (c) generating the number list when the character list is formed to edit the short message on the short message editing interface;
  (d) matching each character in the character list with a number in the number list;
  (e) activating the number list by pressing the preconfigured key-press;
  (f) activating a normal key-press on the mobile device corresponding to a number in the number list; and
  (g) selecting a character matched with the number from the character list to edit the short message.

5. The method as described in claim 4, further comprising:
  determining whether another character needs to be selected to edit the short message; and
  going to step (b) if another character needs to be selected to edit the short message.

6. The method as described in claim 4, wherein the character is selected from the group consisting of a letter, a number, and a punctuation mark.

7. A storage medium having stored thereon instructions that, when executed by a processor of a mobile device, causing the mobile device to perform a method for selecting a character to edit a short message, wherein the method comprises:
  (a) controlling a display unit of the mobile device to display a short message editing interface;

(b) setting a preconfigured key-press of the mobile device to be an activation key-press of a number list corresponding to a character list;
(c) generating the number list when the character list is formed to edit a short message on the short message editing interface;
(d) matching each character in the character list with a number in the number list;
(e) activating the number list by pressing the preconfigured key-press;
(f) activating a normal key-press on the mobile device corresponding to a number in the number list; and
(g) selecting a character matched with the number from the character list to edit the short message.

8. The storage medium as described in claim 7, wherein the method further comprises:
   determining whether another character needs to be selected to edit the short message; and
   going to step (b) if another character needs to be selected to edit the short message.

9. The storage medium as described in claim 7, wherein the character is selected from the group consisting of a letter, a number, and a punctuation mark.

* * * * *